UNITED STATES PATENT OFFICE.

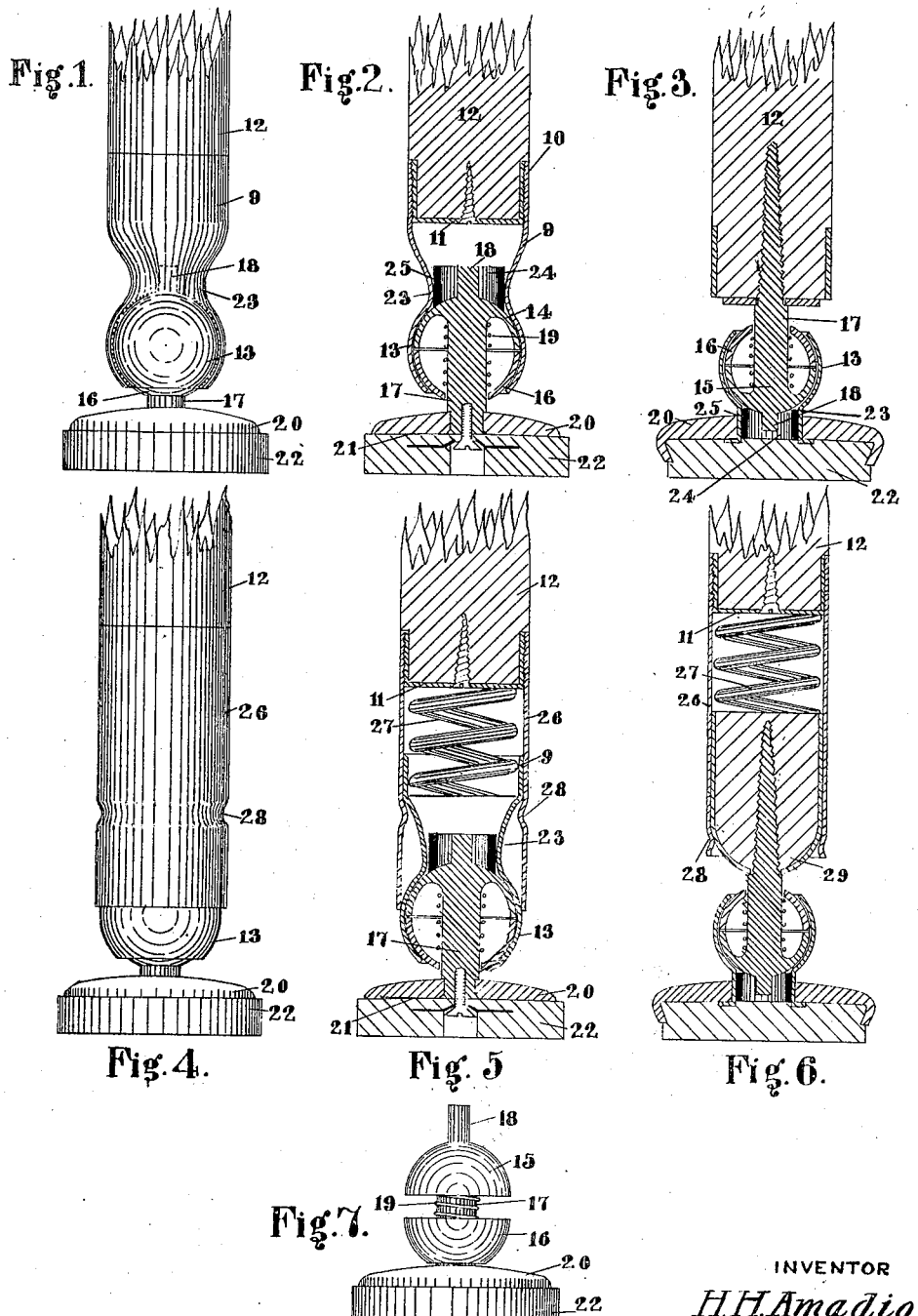

HARRY HENVILLE AMADIO, OF REDFERN, NEAR SYDNEY, NEW SOUTH WALES, AUSTRALIA.

FOOT FOR CRUTCHES, WALKING-STICKS, LADDERS, AND THE LIKE.

1,348,531.      Specification of Letters Patent.      Patented Aug. 3, 1920.

Application filed June 3, 1919. Serial No. 301,525.

*To all whom it may concern:*

Be it known that I, HARRY HENVILLE AMADIO, a subject of the King of Great Britain and Ireland, residing at Redfern, near Sydney, in the State of New South Wales, Commonwealth of Australia, have invented certain new and useful Improvements in Feet for Crutches, Walking-Sticks, Ladders, and the like, of which the following is a specification.

This invention relates to invalid crutches, walking sticks, ladders, tripods and like articles, and has for its object to provide an improved foot for such articles. More particularly the invention has for its object to provide an improved foot of the kind comprising a ball and socket joint, the socket or ball member of which is connected with the lower extremity of the crutch or other article while the remaining member of the ball and socket joint is provided with a shoe member adapted to make flat contact with the ground at all times regardless of the angular position of the crutch or other article.

The present invention consists in a foot of the kind hereinbefore described, comprising a socket member, two hemispherical, cup-shaped parts fitting within the socket member, a resilient element urging the cup-shaped parts in opposite directions, and a stem provided on one of said cup-shaped parts and extending through an aperture in the other of said parts; the extremity of said stem and the socket member being secured one to the crutch or other article and the other to the shoe member.

A further object of the invention is to provide on one of the hemispherical, cup-shaped parts of the joint a projection adapted to move in a chamber having cushioned walls, for the purpose of reducing shock or jar at the lateral limits of angular movement of the crutch or other article relative to the shoe member.

Another object is to provide a buffer spring interposed between the ball and socket joint and the crutch or other article, for the purpose of reducing shock by permitting resilient movement of the crutch or other article in the direction of its length.

The invention further consists in the improved foot for crutches, walking sticks, ladders and other articles substantially as and for the purposes hereinafter described.

But in order that the invention may be clearly understood reference will now be made to the drawings which accompany and form part of this complete specification and in which:—

Figure 1 is an elevation showing the invention applied to a crutch or the like.

Fig. 2 is a section of same.

Fig. 3 is a modification in which the position of ball joint is reversed.

Fig. 4 is an elevation showing the invention with shock absorber.

Fig. 5 is section of same.

Fig. 6 is a section showing the shock absorber applied to the modification illustrated in Fig. 3.

Fig. 7 is an elevation of the ball joint and shod disk removed from the socket.

Referring to Figs. 1, 2, and 7 the ferrule or socket 9 is internally screw threaded at its top end 10 so as to adapt it to engage an externally screw threaded cap 11 on end of crutch stick 12.

The other end of ferrule is spun or otherwise constructed to surround and form a socket 13 for ball 14. The ball 14 is constructed of two semi-spherical pieces 15 and 16 (Fig. 7) the former of which has a central shank or stalk 17 and a projecting pintle 18. The other half 16 of the ball has a central aperture and is adapted to move on the stalk 17.

Between the two halves 15 and 16 of the ball is an intermediate spring 19 which surrounds the stalk 17. When the ball is inclosed in the socket 13 the two halves 15 and 16 are drawn closely together to form the ball or sphere 14.

The internal spring 19 which is now compressed, maintains a constant tension on the moving half 16 of ball against the inner wall of the socket 13, thus preventing the ball working loose in the socket by taking up any wear.

The free end of the stalk 17 is riveted or otherwise firmly secured to a metal disk 20 which has its under face 21 slightly concave. To the under face of the disk 20 is attached a shoe 22 of rubber or other suitable material.

The reason for slightly dishing the under face of the disk 20 is that when rubber or other resilient material is used for the shoe 22 (as in the case of an invalid crutch or stick) a slight suction is obtained when used on smooth wet pavements or tiled or polished floors, thus preventing slipping.

The neck or contracted portion 23 in ferrule 9 immediately above the ball and socket joint forms a chamber 24 of predetermined diameter in which the pintle 18 projecting from the ball 14 moves and is provided for the purpose of—

1st. Limiting the movement of the ball and socket joint and preventing the lower edge of the socket 9 coming into contact with the disk 20.

2nd. To prevent any knocking noise by the introduction of a leather or rubber washer 25 as a cushion for the pintle 18.

3rd. To provide a chamber to hold a lubricant or anti-friction material for the ball and socket joint such as graphite or the like.

Figs. 4 and 5 illustrate the invention with a buffer spring introduced between the crutch stick and the jointed foot for the purpose of absorbing the road shock and thus easing to some extent the strain on an invalid using a crutch or stick. The device illustrated in these two figures is in all respects similar to that hereinbefore described with reference to Figs. 1, 2 and 7 except that the cap 11 on end of crutch stick 12 is attached to an outer tube 26 which telescopes over the ferrule 9 and rests on a strong intermediate buffer spring 27. A small groove 28 is swaged or otherwise formed in the outer tube 26 at the top of the neck 23 of inner tube 9 for the purpose of preventing the outer tube moving upward, while at the same time it is free to move downward.

Referring to Fig. 3 which illustrates a modification in construction which enables the device to be applied to a stick thinner than the usual crutch stick, and further enables the wearing surface of the ball joint to be brought nearer the ground which under some circumstances may be found advantageous. In this case the position of the ball joint is reversed that is to say, the half ball 15 carrying stalk 17, and pintle 18, is at the bottom, and the other half 16, on the top, the socket 13 being secured to the disk 20 the chamber 24 with cushion washer being formed therein. The stalk 17 is extended and adapted to be driven or screwed into the stick 12. The disk 20 is flanged to retain the rubber shoe 22.

Referring to Fig. 6 which illustrates a suitable method of applying a shock absorbing spring to the modified construction of jointed foot hereinbefore described with reference to Fig. 3. The stick 12 is provided as shown in Figs. 1, 2, 4 and 5 with a screwed cap 11 to which is screwed an outer tube 26 which telescopes over an inner plugged tube 29 into which the extended stalk 17 of ball and socket joint is screwed or driven.

A shock absorbing spring 27 is introduced between the stick 12 and the jointed foot as in Fig. 5.

The outer tube 26 has a groove 28 at the bottom to prevent upward movement.

I claim:

1. A foot of the kind hereinbefore described, comprising a shoe member, a socket member, two hemispherical, cup-shaped parts fitting within the socket member, a resilient element urging the cup-shaped parts in opposite directions, and a stem provided on one of said cup-shaped parts and extending through an aperture in the other of said parts; the extremity of said stem and the socket member being secured, one to the crutch or other article and the other to the shoe member.

2. A foot of the kind hereinbefore described, comprising a shoe member, a socket member, two hemispherical, cup-shaped parts fitting within the socket member, a resilient element urging the cup shaped parts in opposite directions, a projection on one of said cup-shaped parts, and a stem provided on the cup-shaped part having the projection and extending through an aperture in the other of said parts; the said stem and the socket member being connected, one to the crutch or other article and the other to the shoe member, while the said projection is adapted to move in a chamber having cushioned walls.

3. A foot of the kind hereinbefore described comprising a shoe member, a socket member, two hemispherical, cup-shaped parts fitting within the socket member, a resilient element urging the cup-shaped parts in opposite directions, a buffer spring interposed between the ball and socket joint and the crutch or other article, and a stem provided on one of said cup-shaped parts and extending through an aperture in the other of said parts; the extremity of said stem and the socket member being connected, one to the crutch or other article and the other to the shoe member.

4. A foot of the kind hereinbefore described comprising a shoe member, a socket member, two hemispherical, cup-shaped parts fitting within the socket member, a resilient element urging the cup-shaped parts in opposite directions, a buffer spring interposed between the ball and socket joint and the crutch or other article, a projection on one of said cup-shaped parts, and a stem provided on the cup-shaped part having the projection and extending through an aperture in the other of said parts; the extremity of said stem and the socket member being connected, one to the crutch or other article and the other to the shoe member, while the said projection is adapted to move in a chamber having cushioned walls.

In testimony whereof I have affixed my signature in presence of two witnesses.

HARRY HENVILLE AMADIO.

Witnesses:
 H. O. ALLEN,
 W. ALLEN.